United States Patent
Guo et al.

(10) Patent No.: US 9,655,184 B2
(45) Date of Patent: May 16, 2017

(54) ARRANGEMENT AND METHOD FOR CONTROLLING A PLURALITY OF LIGHT-EMITTING DIODES WHICH ARE CONNECTED IN SERIES

(71) Applicant: Varroc Lighting Systems s.r.o., Senov u Noveho Jicina (CZ)

(72) Inventors: Hongxin Guo, Köln-Marsdorf (DE); Qiang Cao, Köln-Marsdorf (DE); Andre Fischer, Köln-Marsdorf (DE)

(73) Assignee: VARROC LIGHTING SYSTEMS S.R.O., Senov u Noveho Jicina (CZ)

( * ) Notice: Subject to any disclaimer, the term of this patent is extended or adjusted under 35 U.S.C. 154(b) by 0 days.

(21) Appl. No.: 15/085,013

(22) Filed: Mar. 30, 2016

(65) Prior Publication Data

US 2016/0295655 A1 Oct. 6, 2016

(30) Foreign Application Priority Data

Mar. 31, 2015 (DE) ........................ 10 2015 104 973

(51) Int. Cl.
*H05B 37/02* (2006.01)
*H05B 39/00* (2006.01)
*H05B 33/08* (2006.01)

(52) U.S. Cl.
CPC ..... *H05B 33/0824* (2013.01); *H05B 33/0812* (2013.01); *H05B 33/0827* (2013.01);
(Continued)

(58) Field of Classification Search
CPC ............ H05B 33/0827; H05B 33/0815; H05B 33/0824; H05B 33/0866; H05B 33/0812;
(Continued)

(56) References Cited

U.S. PATENT DOCUMENTS 8,044,609 B2 * 10/2011 Liu ...................... H05B 33/086
315/291
8,624,512 B2 * 1/2014 Li ...................... H05B 33/0827
315/192

(Continued)

FOREIGN PATENT DOCUMENTS

DE 102006059355 6/2008
DE 102011016802 10/2012

*Primary Examiner* — Vibol Tan
(74) *Attorney, Agent, or Firm* — Ursula B. Day; Law Firm of Ursula B. Day

(57) ABSTRACT

An arrangement and a method for controlling a plurality of light emitting diodes which are connected in series to attain uniform distribution of a total current to several series connections, LED chains, connected in parallel to each other wherein circuitry-related expenditure and power losses occurring during the control process are minimized, include a first reference voltage generating unit and a second reference voltage generating unit, wherein a outlet of the first reference voltage generating unit is connected to a first and a second control circuit, and an outlet of the second reference voltage generating unit is connected to the second and the first control circuit, and an outlet of the first control circuit is connected to a control inlet of the first controllable semiconductor switch, and an outlet of the second control circuit is connected to a control inlet of the second controllable semiconductor switch.

6 Claims, 8 Drawing Sheets

| Voltage VCC | 12.5 V |
|---|---|
| Total current I1 | 1.01 A |
| Partial current Ia LED chain 2a | 505 mA |
| Voltage LED chain 3a | 11.58 V |
| Partial current Ib LED chain 2b | 508 mA |
| Voltage LED chain 2b | 14.75 V |
| Voltage Drain and Source M1 | 8 mV |
| Voltage Drain and Source M2 | 3.158 V |
| Voltage Gate M1 | 3.53 V |
| Voltage Gate M2 | 11.57 V |
| Reference voltage V1 | 1.558 V |
| Reference voltage V2 | 1.559 V |

(52) U.S. Cl.
    CPC ..... *H05B 33/0866* (2013.01); *H05B 33/0887* (2013.01); *H05B 37/02* (2013.01)

(58) Field of Classification Search
    CPC ............ H05B 33/0851; H05B 33/0887; H05B 41/2851; Y02B 20/346; Y02B 20/347; Y02B 20/345; G09G 3/34; G09G 3/3406; G09G 3/342
    See application file for complete search history.

(56) References Cited

U.S. PATENT DOCUMENTS

| | | | |
|---|---|---|---|
| 8,674,621 B2* | 3/2014 | Ge | H05B 33/0812 |
| | | | 315/209 R |
| 9,018,845 B2* | 4/2015 | Ge | H05B 33/0815 |
| | | | 315/192 |
| 2009/0187925 A1* | 7/2009 | Hu | H05B 33/0815 |
| | | | 719/327 |
| 2010/0013411 A1 | 1/2010 | Krespach et al. | |
| 2011/0080115 A1 | 4/2011 | Ge et al. | |
| 2012/0112643 A1* | 5/2012 | Lin | H05B 33/0818 |
| | | | 315/185 R |
| 2012/0268021 A1 | 10/2012 | Lee et al. | |
| 2013/0119873 A1 | 5/2013 | Fujita | |

\* cited by examiner

| | |
|---|---|
| Voltage VCC | 12.5 V |
| Total current I1 | 1.01 A |
| Partial current Ia LED chain 2a | 505 mA |
| Voltage LED chain 3a | 11.58 V |
| Partial current Ib LED chain 2b | 508 mA |
| Voltage LED chain 2b | 14.75 V |
| Voltage Drain and Source M1 | 8 mV |
| Voltage Drain and Source M2 | 3.158 V |
| Voltage Gate M1 | 3.53 V |
| Voltage Gate M2 | 11.57 V |
| Reference voltage V1 | 1.558 V |
| Reference voltage V2 | 1.559 V |

Fig. 8

ARRANGEMENT AND METHOD FOR CONTROLLING A PLURALITY OF LIGHT-EMITTING DIODES WHICH ARE CONNECTED IN SERIES

CROSS-REFERENCES TO RELATED APPLICATIONS

This application claims the priority of German Patent Application Serial No. 10 2015 104 973.2, filed Mar. 31, 2015 pursuant to 35 U.S.C. 119(a)-(d), the subject matter of which is incorporated herein by reference.

BACKGROUND OF THE INVENTION

The present invention relates to an arrangement for controlling a plurality of light-emitting diodes which are connected in series, such a series connection being referred to as LED chain; at least two of said LED chains are connected in parallel to each other and are connected to a constant current source with respectively one first end of the LED chain, wherein the LED chains with the second ends thereof are at least indirectly connected to a second end of the constant current source via a correspondingly associated controllable semiconductor switch.

The invention also relates to a method for controlling a plurality of light-emitting diodes which are connected in series being referred to as LED chain, wherein a provided total current I is divided into a first partial current Ia associated with a first LED chain and a second partial current Ib associated with a second LED chain, wherein a first means for current control of the first partial current Ia is provided in series connection with the first LED chain, and a second means for current control of the second partial current Ib in provided in series connection with the second LED chain.

In many fields of electronics, light-emitting semiconductor diodes, also referred to as light-emitting diodes or briefly LEDs, are employed to realize display or lighting functions. This applies in particular to the field of automotive engineering, where light-emitting diodes are designed to replace the hitherto used light bulbs, for instance both in the field of motor vehicle interior applications, instrument panel lighting and in the field of prescribed standard lighting devices.

The special advantages of light-emitting diodes compared to conventional light bulbs can be seen in low power consumption, high luminous efficiency, relatively low heat generation as well as long service life. Moreover, light-emitting diodes do not have a starting delay and provide a smooth dimming function.

For this purpose, several solutions are known from prior art. In addition to the utilization of a current-limiting series resistance, regulated constant current sources as well as linear controllers are employed.

Arrangements, in which several LEDs are connected in series, are equally known, for instance to enhance light intensity. In this case too, current control and/or current limitation of the current flowing through all LEDs of the series connection is/are necessary.

When using a constant current source for providing a regulated operating current for the LEDs, the number of LEDs which can be arranged in the series connection is limited, in particular due to the supply voltage available in a motor vehicle. Conventional supply voltages lie in the range of for instance 12V for motor vehicles, 24V for trucks and 48V for electric and hybrid motor vehicles. If light intensity, which can be generated by means of an LED series connection, which is also referred to as LED chain, is insufficient, provision has to be made for at least one additional LED chain. Each additional LED chain, in turn, necessitates a separate constant current source, whereby expenditure and costs in connection with the entire lighting system are increased.

Alternatively, according to prior art, several LED chains can be operated in parallel connection with a single voltage source, whereby each LED chain requires a controller for current limitation. Said controller is respectively connected in series with the corresponding LED chain. In this case too, costs are increased due to the necessity of several controllers for several LED chains. Moreover, voltage drop along with corresponding electrical losses as well as unwanted heat development of the controller occur via each controller, also in an operating state, where the controller is fully controlled.

US patent publication 2011/0080115 A1 discloses an arrangement for generating constant partial currents for controlling several LEDs (LED chain) which are connected in series. Said arrangement has several outlets which have LED chains connected thereto. It is provided that the total current I generated by a constant current source is distributed to the LED chains which are connected in parallel with the constant current source. For this purpose, each LED chain is connected in series with a separate current divider arrangement, wherein each current divider arrangement is connected to a separate control arrangement for controlling the partial current through the LED chain.

US patent publication 2012/0268021 A1 describes a multi-channel LED driver arrangement for LED chains. Said arrangement comprises inter alia a power supply unit, a rectifier and filter unit, several LED chains, linear controllers, controllers and PWM units. It is the object of the arrangement to provide uniform currents to the LED chains being connected to the power supply, in order to thereby prevent for instance brightness differences between the LED chains.

Each LED chain is provided with a linear controller, which regulates the current of the connected LED chain. This regulator operates for instance with a MOSFET switch, which is controlled via an associated controller.

US patent publication 2013/0119873 A1 discloses an arrangement and a method for operating an LED backlighting. Said arrangement comprises a plurality of LEDs of a backlighting, which are connected in series, an associated driver, a current divider as well as a power supply unit. It is disclosed that the drivers are each connected in series with respectively one LED chain and control the current flowing through said LED chain. The LED chains are supplied via a common voltage supply unit.

The drawbacks resulting from said known prior art thus reside in high circuitry-related expenditure for several constant current sources, respectively necessary units for current regulation and the thusly associated high costs. Moreover, longitudinal controllers also always cause a voltage drop in the series connection along with electrical losses and heat generation, which under certain circumstances necessitates further cooling measures.

It would therefore be desirable and advantageous to provide an improved arrangement and method for controlling a plurality of light emitting diodes connected in series to obviate prior art shortcomings.

SUMMARY OF THE INVENTION

In one aspect of the present invention an arrangement for controlling several light-emitting diodes which are connected in series is provided which makes it possible to attain uniform distribution of a total current to several of said series connections (LED chains) which are arranged in parallel to each other, and wherein circuitry-related expenditure and power losses are minimized.

In another aspect, the present invention enables an accurate division of a total current I of a constant current source into the partial currents of two or several LED chains which are arranged in parallel to each other. To this end, it is provided that an associated reference voltage is created in each branch circuit associated with an LED chain by means of a reference voltage generating unit, which is in a relation to the current flowing in the associated LED chain.

In fact, two reference voltages are provided in the two LED chains or branch circuits. Said reference voltages are each delivered to a difference formation in such a manner that the inherent reference voltage is always deducted from the reference voltage of the opposite branch circuit. The result of said difference formation generates a control signal, by means of which a controllable semiconductor switch, which is connected in series with the respective LED chain, is controlled.

Said semiconductor switch changes its resistance due to the applied control signal and thus thereby impairs the partial current flow of the associated LED chain. As a result of said regulation, the partial currents are regulated until they are of the same magnitude.

The present invention resolves prior art problems by an arrangement for controlling at least two LED chains connected in parallel, each LED chain composed of a plurality of light-emitting diodes connected in series, wherein a first end of each LED chain is connected to a first terminal of a constant current source, wherein a second end of each LED chain is at least indirectly connected with a second terminal of the constant current source via a current divider arrangement, the current divider arrangement including a first current controller comprising a first reference voltage generating unit connected in series with a first controllable semiconductor switch configured to control a current flowing through a first of the at least two LED chains, a first control circuit controlling the first controllable semiconductor switch and having a non-inverting input and an inverting input, with the inverting input receiving a first reference voltage depending on a current flowing through the first of the at least two LED chains, and a second current controller comprising a second reference voltage generating unit connected in series with a controllable semiconductor switch configured to control a current flowing through a second of the at least two LED chains, a second control circuit controlling the second controllable semiconductor switch and having a non-inverting input and an inverting input, with the inverting input receiving a second reference voltage depending on a current flowing through the second of the at least two LED chains, wherein the non-inverting input of the first controllable semiconductor switch receives the second reference voltage and the non-inverting input of the second controllable semiconductor switch receives the first reference voltage.

In a further aspect of the present invention, a method is provided for controlling at least two LED chains connected in parallel, each LED chain composed of a plurality of light-emitting diodes connected in series including dividing a total current into a first partial current flowing through a first LED chain and a second partial current flowing through a second LED chain, generating a first reference voltage based on the first partial current, and generating a second reference voltage based on the second partial current, and controlling the first partial current based on a difference between the first reference voltage and the second reference voltage, and simultaneously controlling the second partial current based on a difference between the second reference voltage and the first reference voltage.

It is provided that a reference voltage generating unit for generating a reference voltage, a control circuit for generating a control signal as well as a semiconductor switch controllable via the control signal are arranged in each branch circuit to be controlled.

In an advantageous embodiment, it is provided that the control circuit is configured as an operating amplifier.

In another advantageous embodiment, the controllable semiconductor switch is a MOSFET (Metal-Oxide-Semiconductor Field-Effect Transistor).

Further details, features and advantages of embodiments of the invention are apparent from the following specification of exemplary embodiments with reference to the corresponding drawings, wherein:

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 8 shows the results of an experimental proof of the functionality of the inventive current divider arrangement.

DETAILED DESCRIPTION OF PREFERRED EMBODIMENTS

Figure 1:
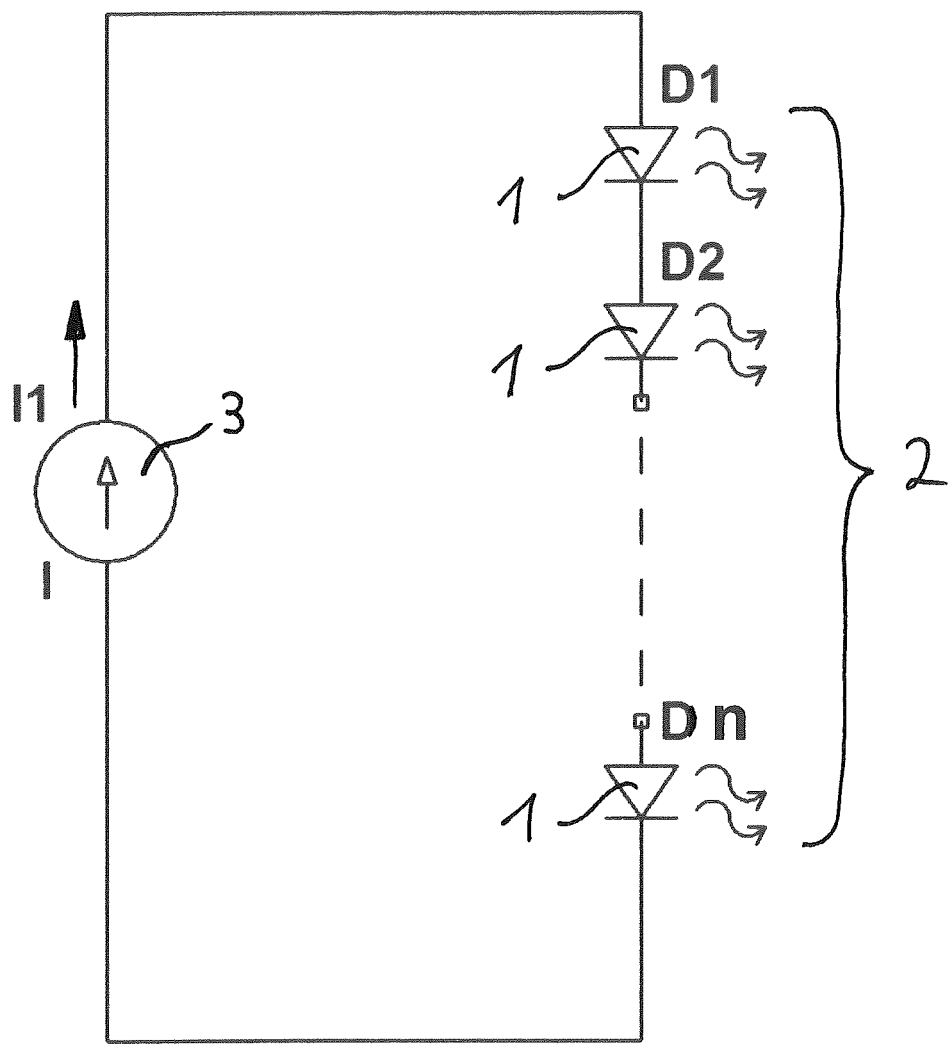
FIG. 1 shows an arrangement for controlling several light-emitting diodes which are connected in series (LED chain) by means of a constant current source according to prior art.

Throughout all the Figures, same or corresponding elements are generally indicated by same reference numerals.

Turning now to the drawing, and in particular to FIG. 1, there is shown an arrangement for controlling several light-emitting diodes 1 (D1, D2, ..., Dn) which are connected in series according to prior art. Such a series connection of light-emitting diodes is hereinafter also referred to as LED chain 2. The current I1 flowing through LEDs 1 D1 to Dn in the LED chain 2 is provided by a constant current source 3.

Such circuits are applied in the field of light control, also for instance in motor vehicle lighting. Hereby, by means of the consecutive connection of a plurality of LEDs to form an LED chain 2, a desired lighting brightness is attained.

For instance due to safety regulations in the field of motor vehicles or the available supply voltage, the voltage available via an LED chain 2 is confined to a value less than or equal to 12, 24, 48 or 60 volts and thus also the number of LEDs 1 in the chain 2. The reason for said confinement thus can be seen in the flow voltage necessary for each LED 1. Said flow voltage is dependent on the wavelength of the emitted light which is output by the light-emitting diode and lies in the range of approximately 1.2 and 3.4 volts.

In order to attain a required brightness, several of such LED chains 2 with an associated current source 2 are thus frequently required, whereby circuitry-related expenditure and costs of such a solution are increased.

Figure 2:
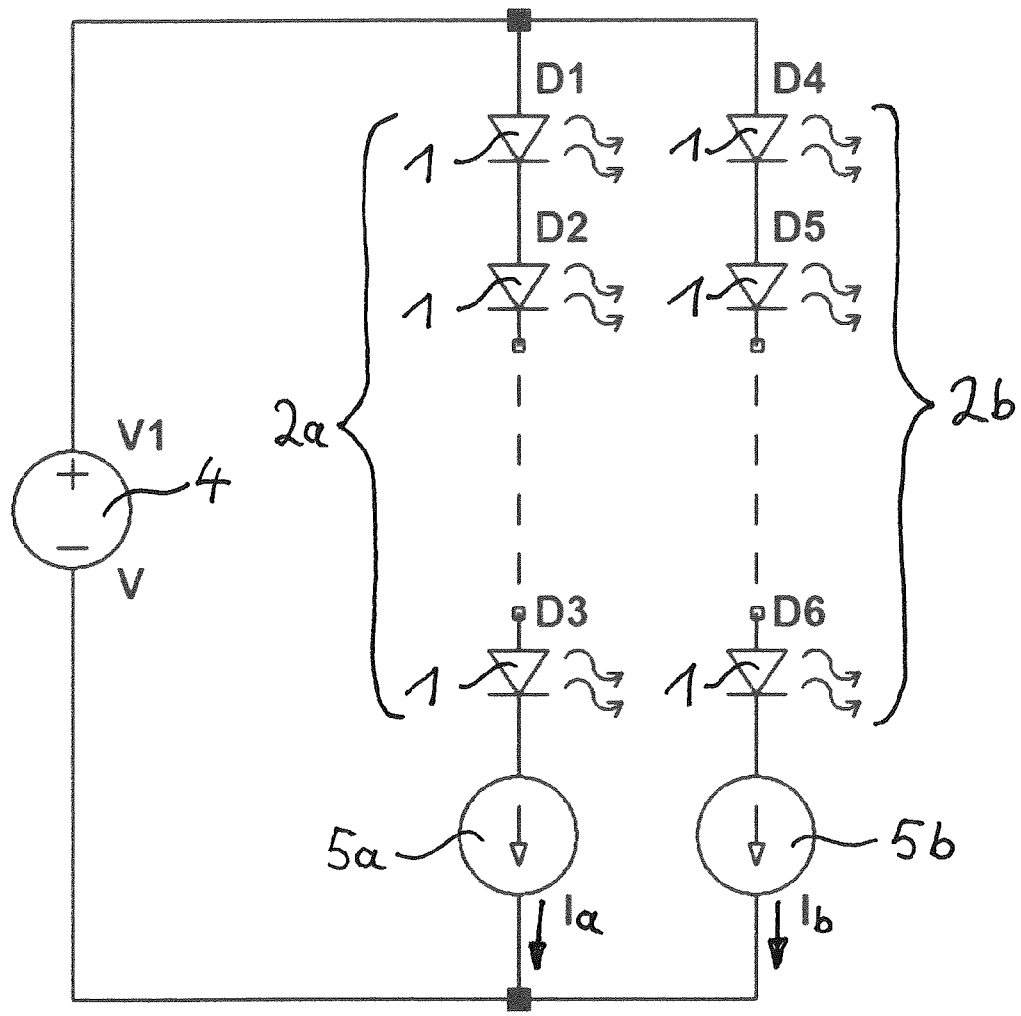
FIG. 2 shows another prior art arrangement for controlling two LED chains which are arranged in parallel to each other by means of respectively one linear controller.

FIG. 2 illustrates an example for another arrangement for controlling several light-emitting diodes 1 which are connected in series for at least two LED chains 2 which are arranged in parallel to each other. Said prior art circuit shows a reference voltage source 4 which provides a voltage V1 for the LED chains 2a and 2b which are arranged in parallel to each other.

For the purpose of controlling the current Ia flowing through the LED chain 2a, provision is made for a linear controller 5a in the form of a longitudinal controller, while the current Ib flowing through the LED chain 2b is regulated via the linear controller 5b. In this regard, the linear controllers 5a and 5b are each connected in series with the associated LED chains 2a and 2b.

Thus, it is a drawback of said arrangement that a reference voltage source 4 for generating a highly accurate voltage V1 is required, which increases circuitry-related expenditure and manufacturing costs. Another drawback can be seen in the voltage drop regularly occurring across the linear controllers 5a and 5b, which typically lies in the range of greater than or equal to 1 volt. Said unavoidable voltage drop across the longitudinal controller leads to the formation of unwanted power losses and heating of the linear controllers 5a and 5b.

Figure 3:
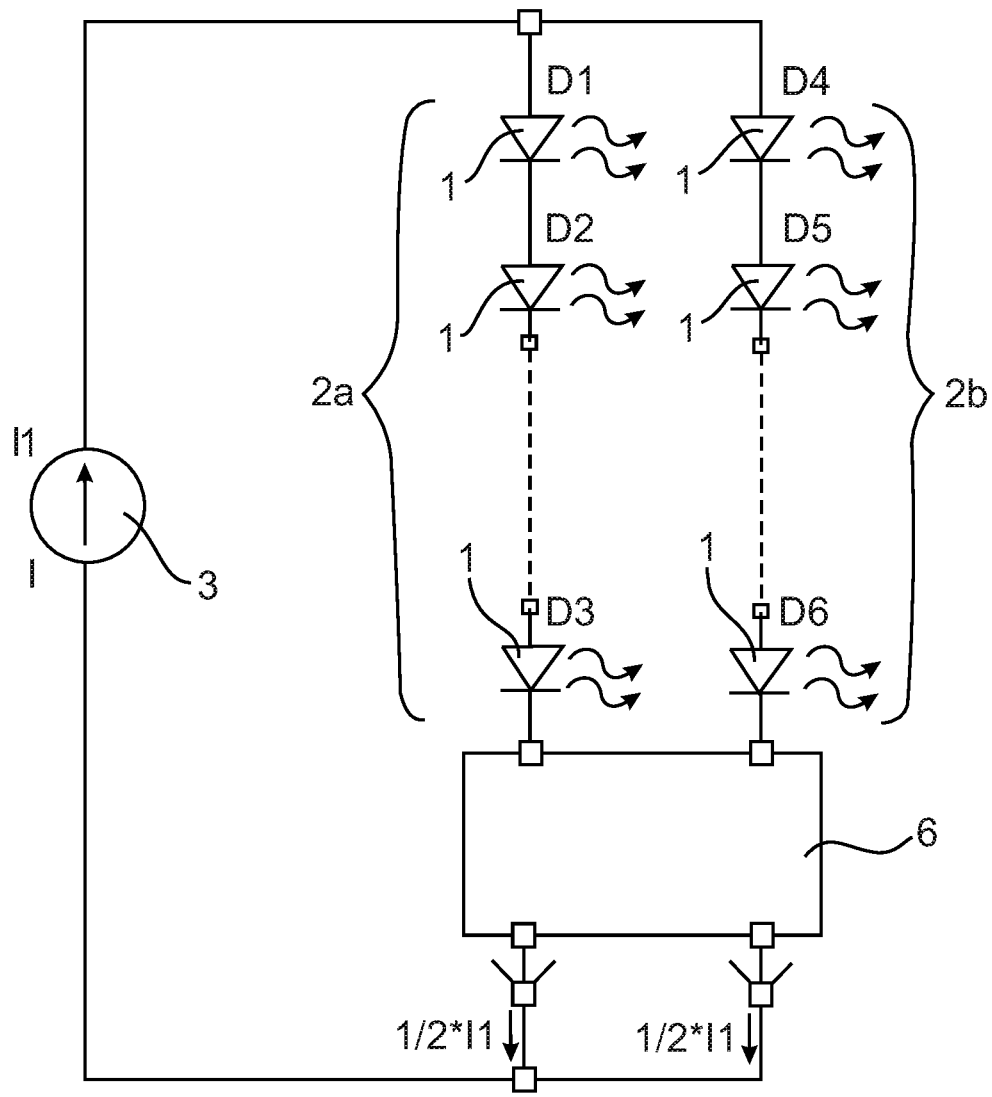
FIG. 3 shows a first schematic embodiment of the present invention with a current divider arrangement for uniform current distribution between two LED chains.

FIG. 3 shows the use of the inventive current divider arrangement 6 for distributing the current I1 provided by the constant current source 3 to two illustrated LED chains 2a and 2b. Three LEDs 1 are illustrated in each LED chain, wherein the LEDs 1 are not confined to only three LEDs per LED chain 2a and 2b. Said schematic diagram shows that the same current flows in each LED chain 2a and 2b which corresponds to half the magnitude of total current I.

Figure 4:
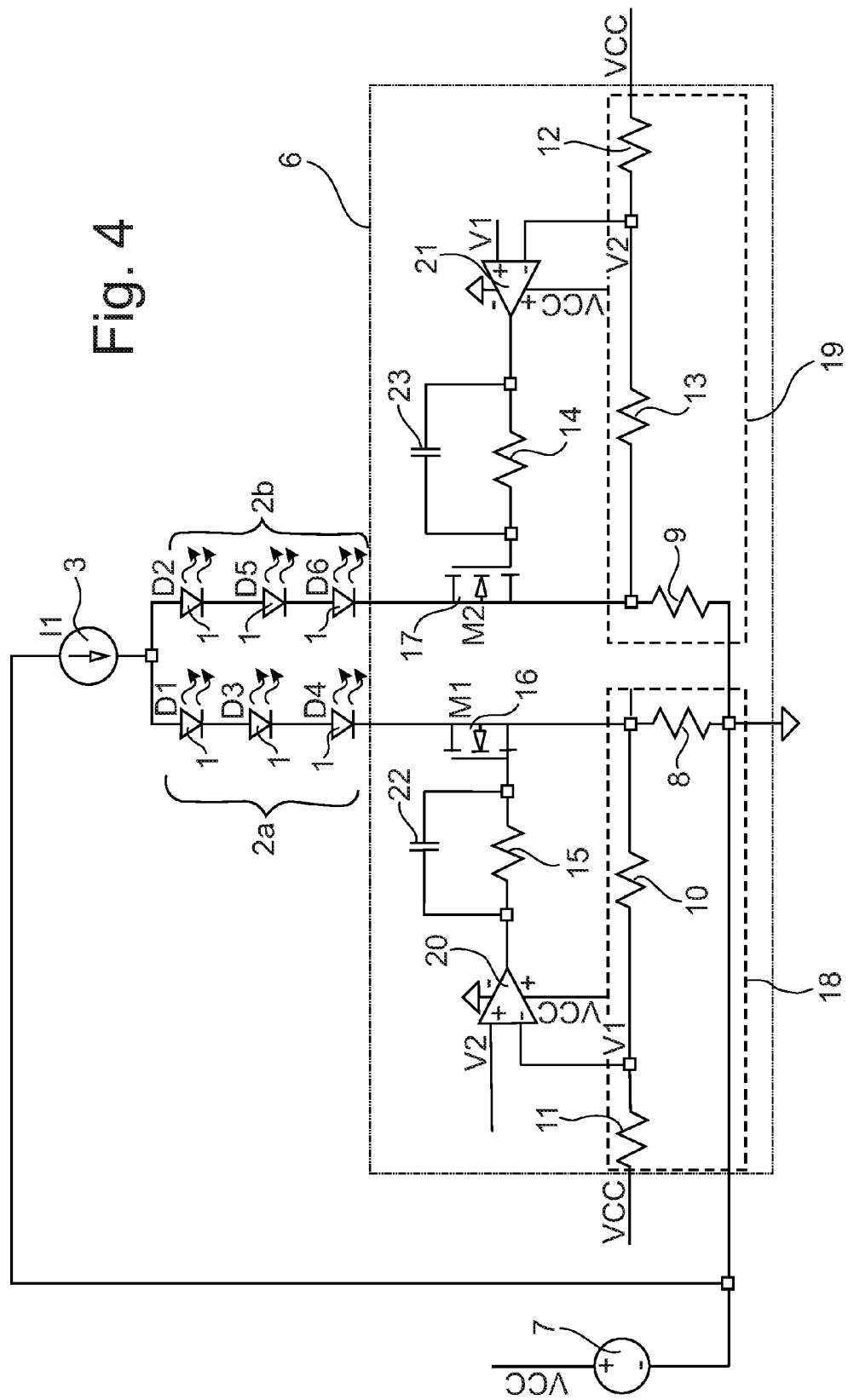
FIG. 4 shows a circuitry-related embodiment of the inventive current divider arrangement according to FIG. 3.

FIG. 4 shows a circuit arrangement for the inventive current divider arrangement 6. As is known from prior art, several LEDs 1 are arranged in a first LED chain 2a and several LEDs 1 are arranged in a second LED chain 2b, wherein said LED chains 2a and 2b are operated in parallel to each other. The currents for both LED chains 2a and 2b are provided by a common constant current source 3 with the current I1. In order to control the current Ia flowing through the LED chain 2a, a first controllable semiconductor switch 16 is arranged, while the control of the current Ib flowing through the LED chain 2b takes place via a second controllable semiconductor switch 17.

In an advantageous embodiment, the controllable semiconductor switches 16 and 17 are configured as MOSFET.

In order to generate a first control voltage required for the first controllable semiconductor switch 16, provision is made for a first reference voltage generating unit 18 and a first control circuit 20. In order to generate the second control voltage required for the second controllable semiconductor switch 17, provision is made for a second reference voltage generating unit 19 as well as a second control circuit 21.

In this regard, the first reference voltage V1 generated by the first reference voltage generating unit 18 is supplied both to the first and the second control circuit 20 and 21 for generating the first control current. In analogy thereto, the second reference voltage V2 generated by the second reference voltage generating unit 19 is supplied both to the second and the first control circuit 21 and 20 for generating the second control voltage. A direct serial connection has been partly omitted in FIG. 4. Hence, for instance the first reference voltage V1 generated in the first reference voltage generating unit 18 is plotted only with V1 at the non-inverting inlet of the second control circuit 21, which however means that there is a serial connection. The same holds true for several connections with the operating voltage VCC generated by voltage source 7.

It is provided that the first control voltage in the first control circuit 20 is generated on the basis of a difference between the second reference voltage V2 and the first reference voltage V1, while the second control voltage in the second control circuit 21 is generated on the basis of a difference between the first reference voltage V1 and the second reference voltage V2.

In the embodiment of FIG. 4, the first control voltage generated in this way is transferred from the outlet of the first control circuit 20 via an eight resistance 15, which is connected in parallel with a first capacitance 22, to the control electrode of the first controllable semiconductor switch 16 M1.

The transfer of the second control voltage to the control electrode of the second controllable semiconductor switch 17 M2 takes place via a seventh resistance 17 which is connected in parallel with a second capacitance 23.

The first reference voltage generating unit 18 is composed of a series connection of the first sensor resistance 8, the third resistance 10 and the fourth resistance 11, wherein the fourth resistance 11 is connected to a first terminal of a current source 7 providing the voltage VCC, and the first sensor resistance 8 is connected to a second terminal of the voltage source 7. The connection point created between the first sensor resistance 8 and the third resistance 10 is connected to the first controllable semiconductor arrangement 16 in such a manner that the current Ia flowing through the LED chain 2a and the semiconductor arrangement 16 also flows through the first sensor resistance 8.

The connection point located between the third resistance 10 and the fourth resistance 11 constitutes the outlet for delivery of the first reference voltage V1.

In analogy with the previously described first reference voltage generating unit 18, the second reference voltage generating unit 19 is equally composed of a series connection of resistances, composed of a second sensor resistance 9, a sixth resistance 13 and a fifth resistance 12. The connection point created between the second sensor resistance 9 and the sixth resistance 13 is connected to the second controllable semiconductor arrangement 17 in such a manner that the current Ib flowing through the LED chain 2b and the semiconductor arrangement 17 also flows through the second sensor resistance 9.

In this case, the connection point located between the sixth resistance 13 and the fifth resistance 12 constitutes the outlet for delivery of the second reference voltage V2.

It is provided that the first and the second control circuit 20 and 21 are realized by means of an operating amplifier. In this regard, the second reference voltage V2 is applied at the non-inverting inlet of the first control circuit 20, and the first reference voltage V1 is applied at the inverting inlet for the purpose of difference formation. The first reference voltage V1 is applied at the non-inverting inlet of the second control unit 21, and the second reference voltage V2 is applied at the inverting inlet thereof for the purpose of difference formation.

In the case of a non-uniform distribution of the total current I1 to the two represented LED chains 2a and 2b, i.e. when the current I1 is not equal to current Ib, reference voltages V1 and V2 are generated with different magnitudes as a function of the current distribution. If, for instance current Ia is greater than current Ib in the circuit according to FIG. 4, the first reference voltage V1 will also be greater than the second reference voltage V2.

Since the first reference voltage V1 applied at the inverting inlet of the first control circuit 20 is greater than the second reference voltage V2 applied at the non-inverting inlet, the control signal is decreased and the first controllable semiconductor switch 16 is controlled in such a manner that the current Ia flowing through the same is decreased. At the same time, since the reference voltages are applied at the second control circuit 21 in reverse order, the second controllable semiconductor switch is more strongly controlled by means of the generated second control signal, whereby the current Ib flowing through the same is increased.

This process is continued until uniformity is realized between partial currents Ia and Ib, i.e. until both have the same magnitude. In other words, partial current Ia and Ib is half the magnitude of current I1.

In an advantageous embodiment provision is made for an accurate configuration of resistances 8, 9, 10, 11, 12 and 13, since the same also have a bearing on the accuracy of the described invention.

Figure 5:
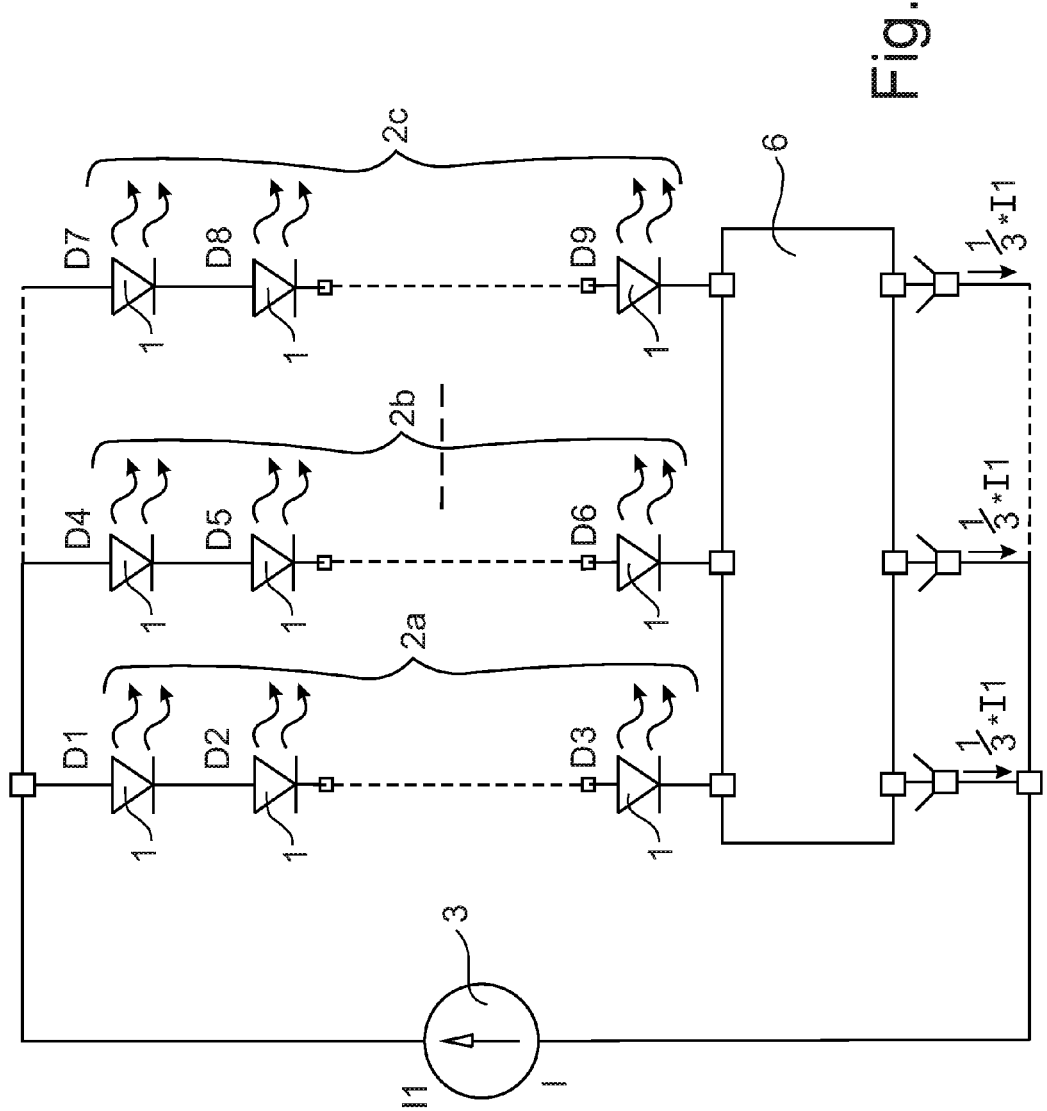
FIG. 5 shows another schematic embodiment of the invention with a current divider arrangement for uniform current distribution between three LED chains.

FIG. 5 shows the use of the inventive current divider arrangement 6 for distribution of current I1 provided by the constant current source 3 to three represented LED chains 2a, 2b and 2c. Said arrangement, just like the presented method, are not confined to applications with only two LED chains 2 which are connected in parallel. Hence, total current I1 can be accurately distributed to three, four or more LED chains 2. In the example according to FIG. 5, it is provided that the partial currents through the three represented LED chains 2 are regulated by means of the current divider arrangement 6 in such a manner that the same each correspond to one third of total current I1.

Figure 6:
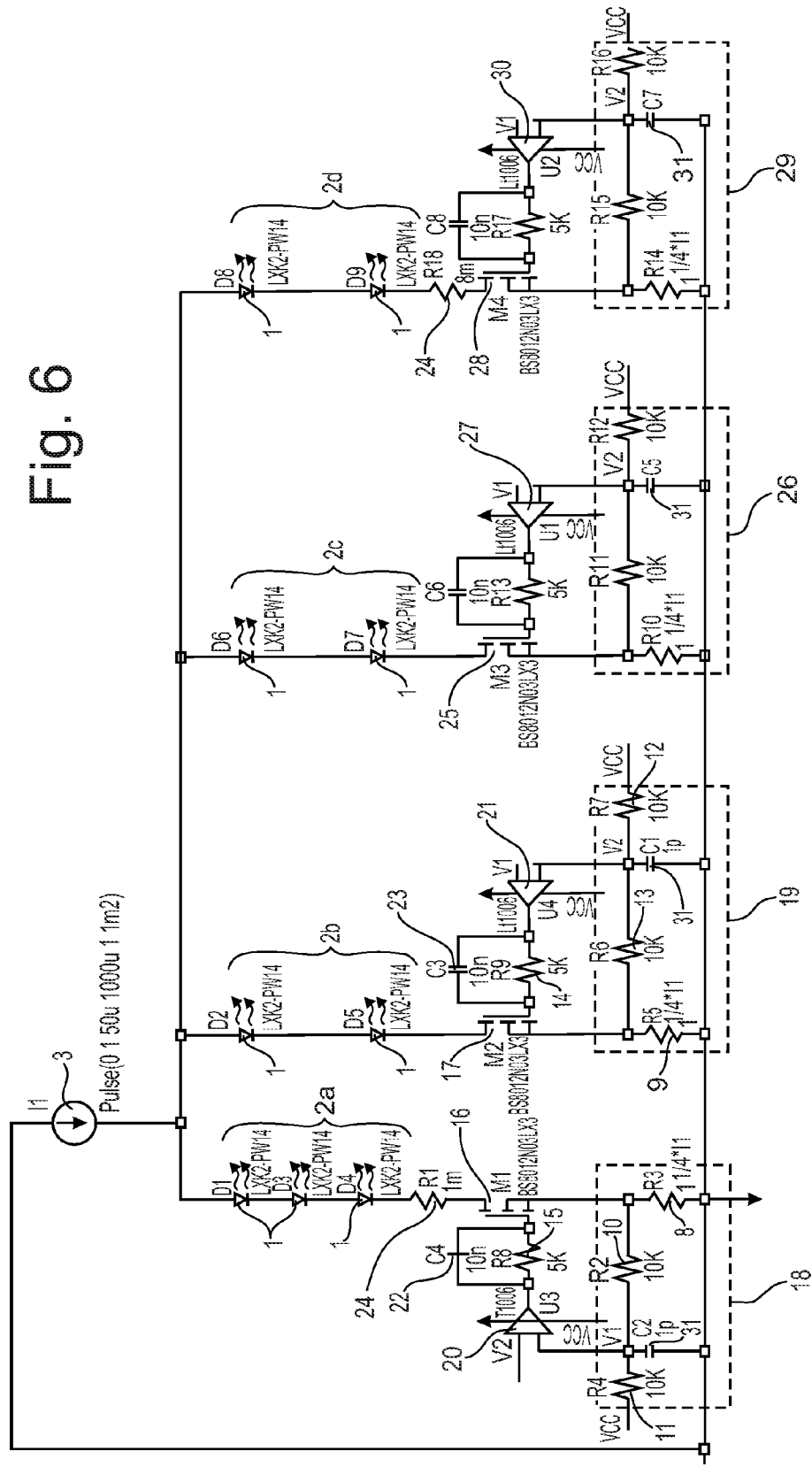
FIG. 6 shows a circuitry-related embodiment of the inventive current divider arrangement with four LED chains.

A circuitry-related implementation of the current divider arrangement 6 with the aid of one example with four LED chains 2a, 2b, 2c and 2d is shown in FIG. 6. The LED chain 2 comprises three LEDs 1, while the LED chains 2b, 2c and 2d are each composed of two LEDs 1. In the left-hand part of the circuit in FIG. 6, the components, which have already been described in detail in FIG. 4, for regulating the currents through the first and the second LED chain 2a and 2b with the first and the second reference voltage generating unit 18 and 19, the first and the second control circuit 20 and 21 and the first and the second controllable semiconductor switch 16 and 17, are illustrated. In contrast to the circuit according to FIG. 4, only a ninth resistance 24 in series connection with the first LED chain 2a as well as several third capacitances 31 have been added to the circuit, which however, do not impair the inventive process flow. In this embodiment too, the lines being denoted with VCC are fed by means of a voltage source 7 (not illustrated).

The add-on of the current divider arrangement 6 for controlling the third and fourth LED chain 2c and 2d takes place via the use of further reference voltage generating units, control circuits and controllable semiconductors.

As illustrated in FIG. 6, a third controllable semiconductor switch 25 as well as a third reference voltage generating unit 26 and a third control circuit 27 are assigned to the third LED chain 2c.

A fourth controllable semiconductor switch 28, a fourth reference voltage generating unit 29 and a fourth control circuit 30 are provided for the fourth LED chain 2d.

The structure and functionality of the switches for the third and fourth LED chain 2c and 2d, in particular the generation of the third and fourth control voltage for the third and fourth controllable semiconductor switch 25 and 28 from the first and second reference voltage V1 and V2 correspond to the specification as put forward concerning the second LED chain 2b.

Figure 7:
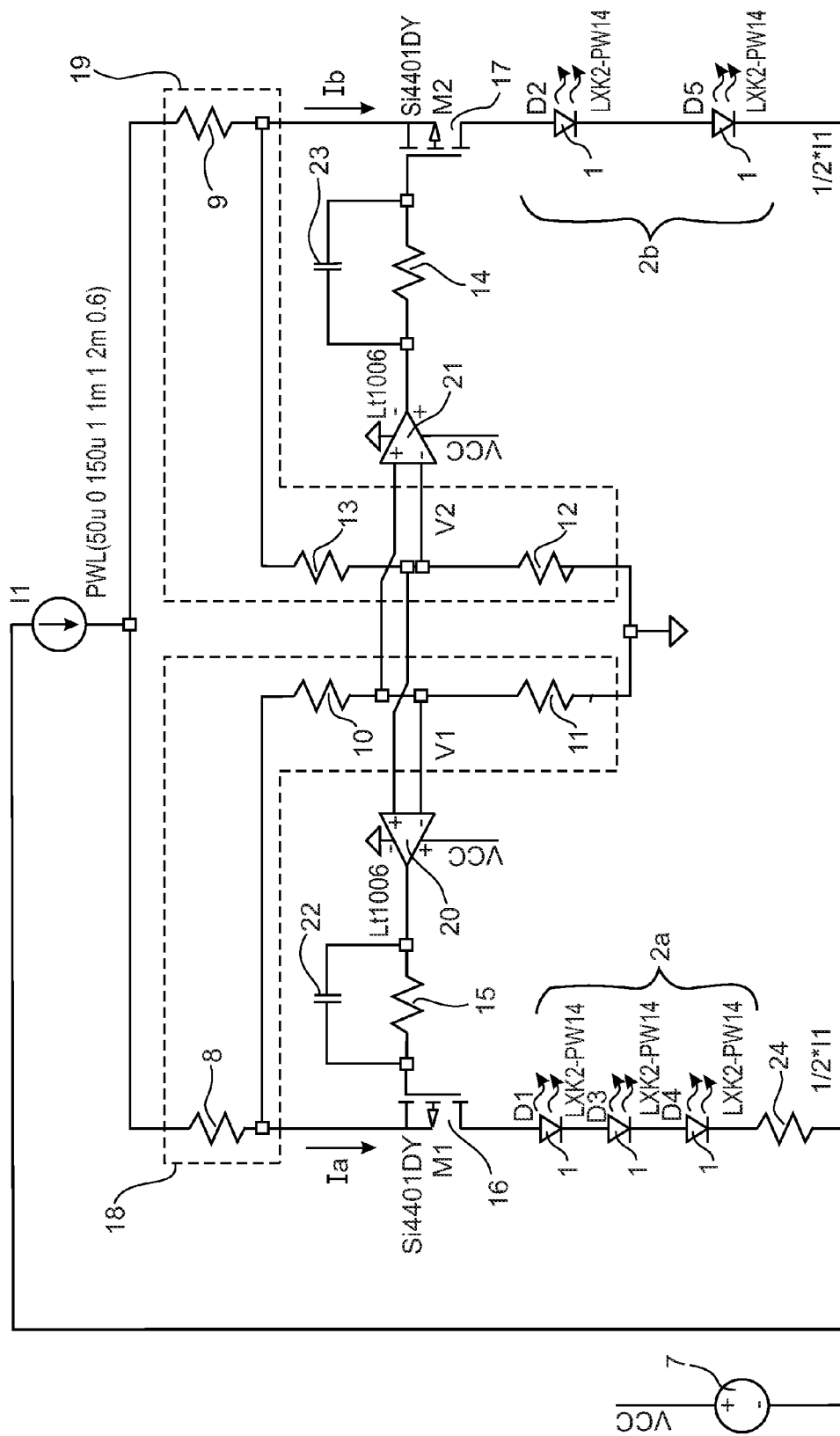
FIG. 7 shows an alternative circuitry-related embodiment of the current divider arrangement for two LED chains.

FIG. 7 shows an alternative embodiment of the current divider arrangement 6 as a so-called high-side current divider. In this embodiment, the LED chains 2a and 2b are each directly connected to the second terminal of the constant current source 3. The connection with the first terminal of the constant current source 3 for the first LED chain 2a, which comprises three LEDs 1, takes place via the first controllable semiconductor switch 16 and the first reference voltage generating unit 18. The connection with the first terminal of the constant current source 3 for the second LED chain 2b, which in the example comprises only two LEDs, takes place via the second controllable semiconductor switch 17 and the second reference voltage generating unit 19. This specification of the connections is of principal nature, even though, as shown in FIG. 7, a ninth resistance 24 can be added optionally.

The regulation principle corresponds to the detailed description as put forward concerning FIG. 4. In this embodiment too, differences in the distribution of partial currents Ia and Ib lead to different reference voltages V1 and V2. The first and the second control circuits 20 and 21 generate control signals from the different reference voltages V1 and V2 so that the controllable semiconductor switch 16 or 17, via which the larger current flows, is regulated. At the same time, the controllable semiconductor switch 16 or 17, through which the smaller current flows, is further controlled. Said regulation process is continued until partial currents Ia and Ib are uniform.

Results of an experimental proof of functionality of the inventive current divider arrangement are shown in the table according to FIG. 8.

The prototype is furnished with two LED chains 2a and 2b. Provision is made for a constant current source 3 in order to provide a constant current I1 of approximately 1 A. The measurement results of the current divider arrangement 6 during operation are represented with selected values in the table of FIG. 8.

As illustrated, the difference in the distribution of total current I1 to partial currents Ia and Ib lies at only 3 mA. The difference between the two LED chains represents a tolerance of merely 0.6%. This slight tolerance has its origin in the tolerances of the employed resistances.

With respect to reference voltages V1 and V2, the tolerance is only 0.06%. Concerning examination of LED chains 2a and 2b, the same have been set such that they exhibit different operating voltages. For this purpose, one LED chain comprises three LEDs 1 and the other LED chain comprises four LEDs 1.

As shown in the table, an exemplary drain source voltage of a controllable semiconductor switch lies at a value of 8 mV. According to a prior art arrangement, as shown in FIG. 2, each linear controller exhibits more than 1V, so that the value of 8 mV lies below this value. Thus, power loss is significantly reduced in the present invention.

While the invention has been illustrated and described as embodied in an arrangement for controlling LED chains, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An arrangement for controlling at least two LED chains connected in parallel, each LED chain composed of a plurality of light-emitting diodes connected in series, wherein a first end of each LED chain is connected to a first terminal of a constant current source, wherein a second end of each LED chain is at least indirectly connected with a second terminal of the constant current source via a current divider arrangement, the current divider arrangement comprising:
   a first current controller comprising a first reference voltage generating unit connected in series with a first controllable semiconductor switch configured to control a current flowing through a first of the at least two LED chains, a first control circuit controlling the first controllable semiconductor switch and having a non-inverting input and an inverting input, with the inverting input receiving a first reference voltage depending on a current flowing through the first of the at least two LED chains, and
   a second current controller comprising a second reference voltage generating unit connected in series with a second controllable semiconductor switch configured to control a current flowing through a second of the at least two LED chains, a second control circuit controlling the second controllable semiconductor switch and having a non-inverting input and an inverting input, with the inverting input receiving a second reference voltage depending on a current flowing through the second of the at least two LED chains,
   wherein the non-inverting input of the first controllable semiconductor switch receives the second reference voltage and the non-inverting input of the second controllable semiconductor switch receives the first reference voltage, wherein the output of the first reference voltage generating unit is connected to a second input of the first control circuit and a first input of the second control circuit, wherein the output of the second reference voltage generating unit is connected to a second input of the second control circuit and a first input of the first control circuit.

2. The arrangement of claim 1, wherein the first reference voltage generating unit comprises a first resistor having a first terminal connected to the second terminal of the constant current source and a second terminal connected to the first controllable semiconductor switch, and two serially connected resistors having one end of the series connection connected to the second terminal and a second end connected to a voltage source supplying an operating voltage, wherein the first reference voltage is tapped at a connection point between the two serially connected resistors of the first reference voltage generating unit, and
   wherein the second reference voltage generating unit comprises a third resistor having a third terminal connected to the second terminal of the constant current source and a fourth terminal connected to the second controllable semiconductor switch, and two serially connected resistors having one end of the series connection connected to the fourth terminal and a second end connected to the voltage source supplying the operating voltage, wherein the second reference voltage is tapped at a connection point between the two serially connected resistors of the second reference voltage generating unit.

3. The arrangement of claim 2, wherein the voltage source supplying the operating voltage is connected to the first and second control circuits.

4. The arrangement of claim 1, wherein three or more of the LED chains are connected in parallel, wherein the current divider arrangement comprises a number of current controllers that correspond to a number of the parallel-connected LED chains.

5. A method for controlling at least two LED chains connected in parallel, each LED chain composed of a plurality of light-emitting diodes connected in series, comprising:
   dividing a total current into a first partial current flowing through a first LED chain and a second partial current flowing through a second LED chain,
   generating a first reference voltage based on the first partial current, and generating a second reference voltage based on the second partial current, and
   controlling the first partial current based on a difference between the first reference voltage and the second reference voltage, and simultaneously controlling the second partial current based on a difference between the second reference voltage and the first reference voltage, wherein three or more of the LED chains are connected in parallel, comprising
   dividing the total current into a number of partial currents corresponding to a number of the LED chains,
   generating respective reference voltages for each of the partial currents, and
   controlling the partial currents based on differences between the respective reference voltages of mutually exclusive pairs of the three or more of the LED chains.

6. The method of claim 5, wherein a first control signal is generated on the basis of a difference between the second reference voltage V2 and the first reference voltage V1, and a second control signal is generated on the basis of a difference between the first reference voltage V1 and the second reference voltage V2.

* * * * *